United States Patent
Perez et al.

(10) Patent No.: US 6,970,351 B2
(45) Date of Patent: Nov. 29, 2005

(54) CONTROLLING ACCESS TO PORTS OF AN ELECTRONIC DEVICE

(75) Inventors: Juan M. Perez, Tomball, TX (US); John E. Calloway, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/808,359

(22) Filed: Mar. 25, 2004

(65) Prior Publication Data

US 2005/0213295 A1  Sep. 29, 2005

(51) Int. Cl.⁷ ............................................. G06F 1/16

(52) U.S. Cl. .................................. 361/683; 312/223.2

(58) Field of Search .............................. 361/679–687, 361/724–727, 728, 729, 730, 731, 732; 312/223.1, 312/214, 223.2, 215, 140.4, 222; 248/676, 248/147; 70/57, 58, 67, 68, 69; 49/294, 324, 49/380, 381

(56) References Cited

U.S. PATENT DOCUMENTS

| | | |
|---|---|---|
| 5,579,657 A | 12/1996 | Makous |
| 5,995,366 A | 11/1999 | Howell et al. |
| 6,018,456 A | 1/2000 | Young et al. |
| 6,122,019 A * | 9/2000 | Do et al. .................... 348/843 |
| 6,137,409 A | 10/2000 | Stephens |
| 6,293,636 B1 | 9/2001 | Le et al. |
| 6,331,934 B1 | 12/2001 | Helot et al. |
| 6,418,014 B1 | 7/2002 | Emerick, Jr. |
| 6,456,495 B1 * | 9/2002 | Wieloch et al. ............. 361/729 |
| 6,836,405 B2 * | 12/2004 | Alfonso et al. ............. 361/683 |

* cited by examiner

Primary Examiner—Anatoly Vortman
Assistant Examiner—Zachary Pape

(57) ABSTRACT

A port control apparatus for restricting access to ports of an electronic device is disclosed. The port control apparatus comprises a housing constructed to lockingly attach to an exterior surface of the device to form an enclosure that houses the ports. Formed in the housing is at least one aperture each dimensioned to prevent passage of a connector adapted to mate with an associated port while permitting passage of cable bodies integral with any connector mated with an associated port.

27 Claims, 6 Drawing Sheets

CONTROLLING ACCESS TO PORTS OF AN ELECTRONIC DEVICE

BACKGROUND

Computing equipment is prevalent in today's personal and business environments. Businesses and individuals rely on the security and integrity of their equipment to ensure continued productivity. However, computers and other types of electronic devices are vulnerable to theft and tampering. Beyond the device itself, there are typically various valuable peripherals attached to computers which are also vulnerable.

For computers and other equipment containing electronic data, the primary value in the device is often the value of the data itself, and not the hardware. Unsecured access to the input output ports of such devices provides an opportunity to remove or copy electronic data stored in the device. For example, Universal Serial Bus (USB) and other ports can be easily and quickly accessed to extract electronic information using disk on keys, flash drives and USB drives. Oftentimes there are no readily visible signs that such a theft or tampering has occurred.

SUMMARY

In one aspect of the invention, a port control apparatus for restricting access to ports of an electronic device is disclosed. The port control apparatus comprises a housing constructed to lockingly attach to an exterior surface of the device to form an enclosure that houses the ports. Formed in the housing is at least one aperture each associated with at least one port of the device. Each aperture is dimensioned to prevent passage of a connector adapted to mate with the at least one associated port while permitting passage of cable bodies integral with any connector mated with an associated port.

In another aspect of the invention, an apparatus for restricting access to at least one port of an electronic device is disclosed. The apparatus comprises a housing constructed to be lockingly engaged to an exterior surface of the device to form a secure enclosure housing the at least one port. Formed in the housing is at least one aperture each associated one or more of the at least one port, each aperture being dimensioned to prevent removal of a connector adapted to mate with any of its associated one or more ports while permitting passage of any cable bodies integral with any connector mated to its associated one or more ports.

In a further aspect of the invention, an electronic device is disclosed. The electronic device comprises a chassis comprising a plurality of walls and a plurality of ports accessibly located on at least one of the plurality of walls to which cables can be connected to operationally couple the electronic device with one or more external devices. The device also comprises a secure enclosure that houses at least one of the plurality of ports, wherein unauthorized access to the operational capabilities of, and data stored in, the electronic device, via the ports, is prevented. The secure enclosure comprises a housing with at least one aperture associated with at least one of the plurality of ports, wherein each of the at least one aperture is dimensioned to prevent a connector adapted to mate with its associated at least one port from passing through the housing while permitting passage of cable bodies integral with connectors mated with the at least one associated port.

BRIEF DESCRIPTION OF THE DRAWINGS

The present invention will be described in conjunction with the accompanying drawings, in which.

DETAILED DESCRIPTION

Some embodiments of the present invention are directed to an apparatus for restricting access to ports of an electronic device thereby preventing unauthorized access to the operational capabilities of, and electronic data stored in, such devices via such ports. Some such embodiments may comprise a housing configured to be secured to an exterior surface of an electronic device to form a secure enclosure that houses the ports. The housing may comprise at least one aperture each associated with at least one port of the device. Each aperture may be configured to prevent passage of a connector adapted to mate with its associated port(s) while permitting passage of a cable integral with such a connector. This prevents impermissible mating of additional connectors to the associated port(s) while not interfering with any connector(s) currently mated to such port(s).

Figure 1A:
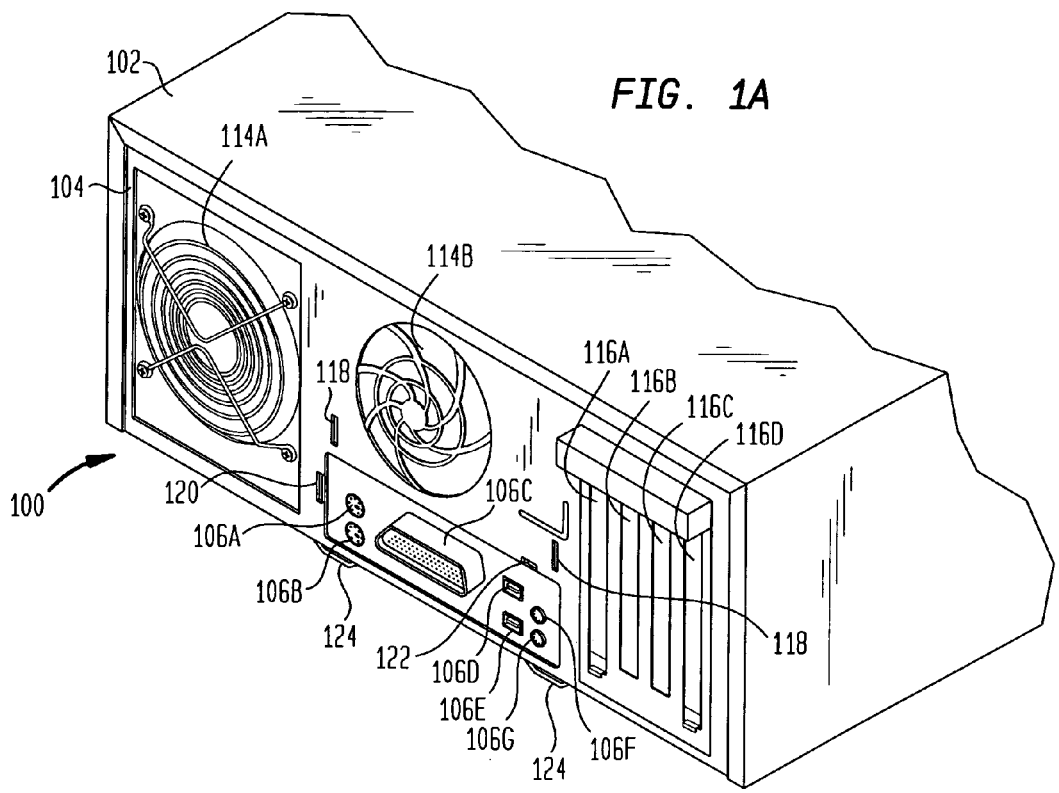
FIG. 1A is a perspective view of a desktop computer configured to lockingly receive a port security cover in accordance with one embodiment of the present invention.
Figure 1B:
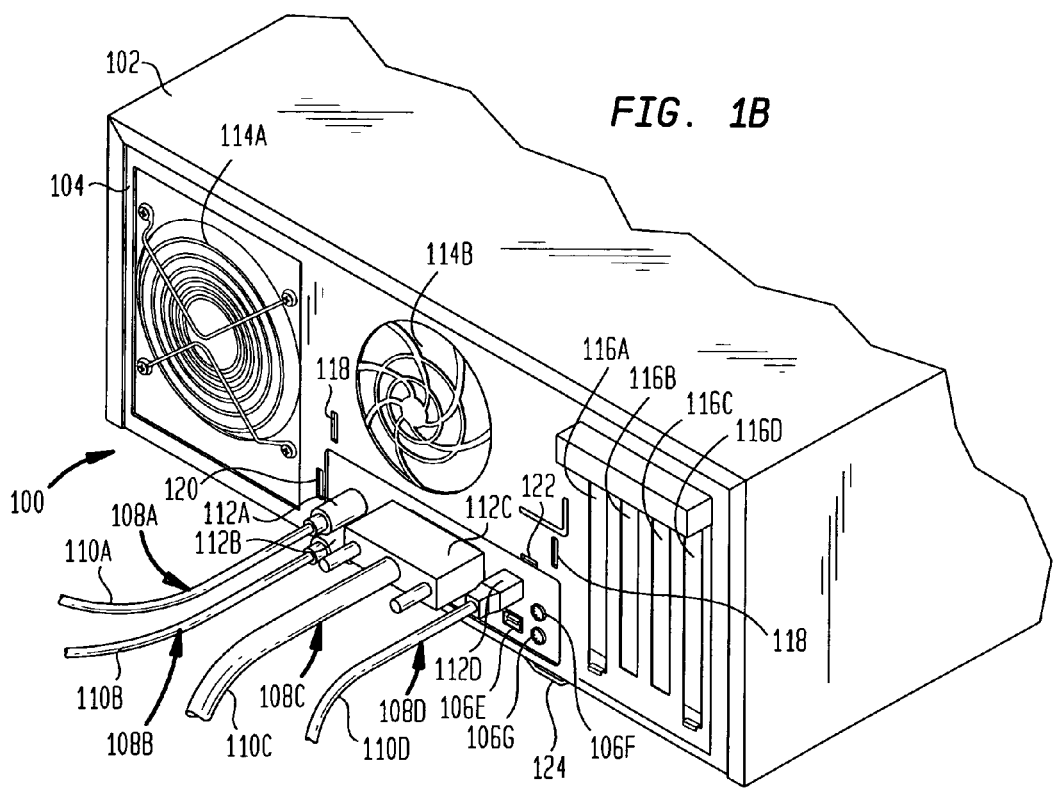
FIG. 1B is a perspective view of the desktop computer shown in FIG. 1A with a number of cables mated to ports of the computer.

The port security apparatus according to one embodiment of the present invention can be used to control access to ports of any electronic device. Electronic devices particularly susceptible to theft of data include desktop computers and workstations, cash registers and other point-of-sale devices, servers and other network devices, and other processor-based or data storage devices commonly found in unsecured business and home environments. Embodiments of the present invention will be described below with reference to one such device, the standard desktop computer. It should be appreciated, however, that embodiments of a port security apparatus can be configured to control access to ports of other electronic devices now or later developed. FIG. 1A is a perspective view of a representative desktop computer configured to receive a port security apparatus (not shown), in accordance with one embodiment of the present invention. FIG. 1B is the same perspective view with cable connectors mated to some of the ports of the computer.

Referring to FIG. 1A, desktop computer 100 has a computer chassis 102 in which a processor, data storage and other components (not shown) are housed. Chassis 102 includes a rear panel 104 accessibly disposed on rear panel 104 is a plurality of plugs, receptacles, terminal pads, and the like (collectively and generally referred to herein as port or ports 106A–106G). Rear panel 104 also includes fan grills 114A, 114B, a series of expansion slot covers 116A–116D, and other components not shown.

The current port interface configuration of computer 100 is illustrated in FIG. 1B. Four cables 108A–108D are mated to ports 106A–106D, respectively. The three remaining ports, ports 106E–106G are currently available. Each cable 108A–108D comprises an elongated cable body 110A–110D, respectively, with an integral connector 112A–112D, respectively, disposed on one end of the cable body. Connectors 112A–112D are each attached to and in signal communication with electrical conductors in the integral cable body 110. Typically, cable bodies are insulated and at least somewhat flexible, and are dimensioned to hold a particular quantity of conductors appropriate for the integrated connector 112.

The opposing end of each cable body 110 is attached to and in signal communication with a peripheral device, other computer, etc., collectively and generally referred to herein as external devices (not shown). Such attachment can be provided either directly by permanently connecting the cable body 110 to the device, or through mated connectors, as is well-known in the art.

As is well-known in the art, external devices can be easily connected to and disconnected from ports 106, enabling a person to change the current port interface configuration of computer 100. Because ports 106 are typically readily accessible and easy to use, the ports can provide unauthorized access to the operational capabilities of, and electronic data stored in, computer 100. For example, data stored in computer 100 can be quickly and easily transferred to a disk on key or other USB-compatible drive connected to Universal Serial Bus (USB) ports 106D or 106E.

Figure 2:
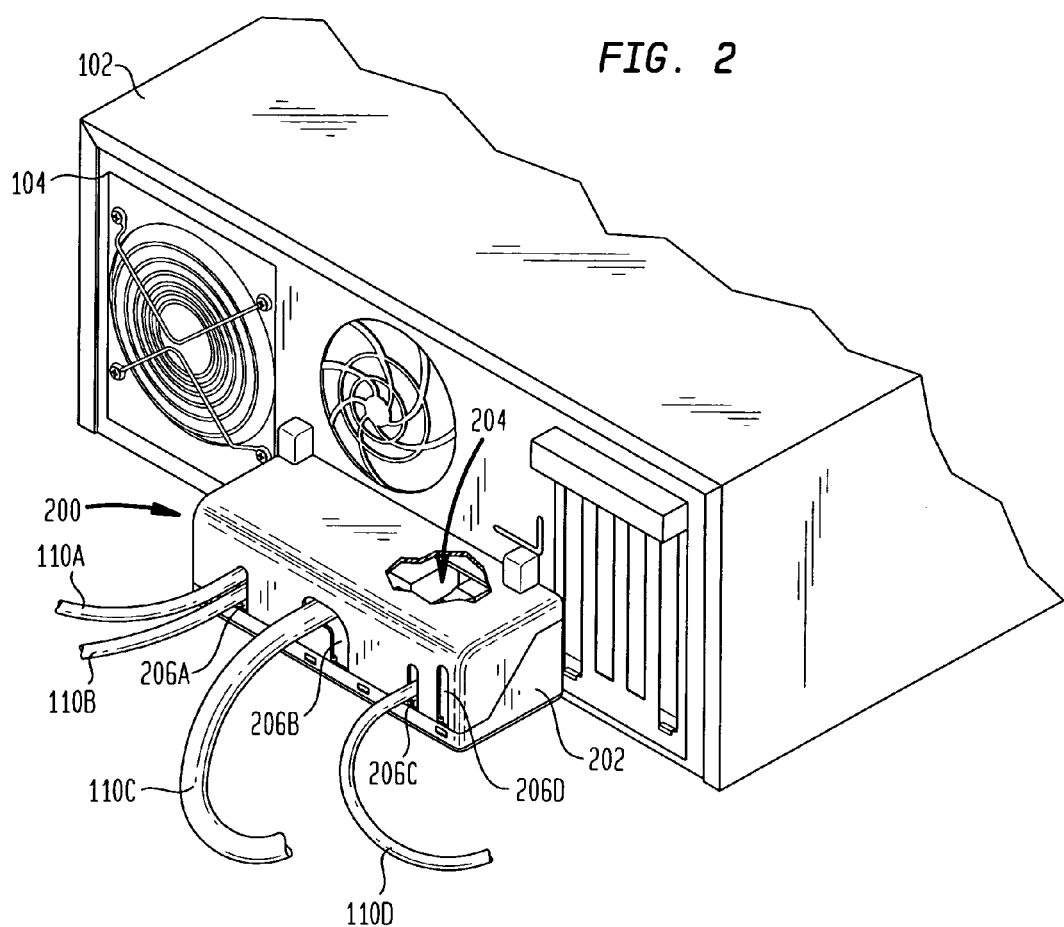
FIG. 2 is a perspective view of one embodiment of a port security cover shown attached to the desktop computer shown in FIG. 1.

FIG. 2 is a perspective view of one embodiment of a port security apparatus of the present invention. In this figure, a port security apparatus 200 is shown attached to desktop computer 100 (FIG. 1) to secure ports 106 disposed on rear panel 104 of the computer. Port security apparatus 200 restricts access to ports 106 of computer 100 thereby preventing unauthorized access to the computer via the ports. Port security apparatus 200 comprises a housing 202 configured to be secured to an exterior surface of computer 100 to form a secure enclosure 204 that houses ports 106 located on rear panel 104. Port security apparatus 200 insures the current port interface configuration of computer 100 is changed by only those persons having authority to access secure enclosure 204 defined by port security apparatus 200 and the exterior surface of computer 100 to which it is attached.

Housing 202 comprises at least one aperture 206 each associated with one or more ports 106 of computer 100. Each aperture 206 is dimensioned to prevent a connector 112 adapted to mate with the associated port or ports 106 from passing through housing 202. That is, appropriately-configured connectors 112 cannot be connected to the secured ports, nor can connectors currently mated with the secured ports be removed from secure enclosure 204. However, to permit authorized use of computer 100, each aperture 206 is also dimensioned to permit passage through housing 202 of cable body 110 for those connectors 112 currently mated with ports 106A–106D.

In the exemplary embodiment illustrated in FIG. 2, aperture 206A is associated with ports 106A and 106B. As such, cable bodies 110A, 110B, which are integral with connectors 112A, 112B, respectively, traverse housing 202 via aperture 206A. Aperture 206A prevents a person from mating a connector to ports 106A, 106B, and further prevents connectors 112A, 112B from being removed from secure enclosure 204.

Similarly, aperture 206B is associated with port 106C and permits passage of cable body 110C, which is integral with connector 112C. Further, in those port interface configurations with lack connector 112C, aperture 206B also prevents an appropriately configured connector from being mated with its associated port 106C.

Aperture 206C is associated with ports 106D and 106E. As such, cable 110D, which is integral with connector 112D, traverses housing 202 via aperture 206C. Aperture 206C is dimensioned to also permit the concurrent passage of another cable integral with a connector configured to mate with port 106E. Aperture 206C prevents a person from connecting a connector to ports 106D, 106E when such ports are unused, and further prevents appropriately-configured connectors such as connector 112D from being removed from secure enclosure 204.

Finally, aperture 206D is associated with ports 106F and 106G. As noted, ports 106F and 106G are available in this exemplary port interface configuration. As such, aperture 206D is dimensioned to prevent the mating of a connector to ports 106F, 106G permits passage of cables integral with such connectors. In those port interface configurations that utilize port 106F and/or port 106G aperture 206D permits passage of cable bodies integral with connectors configured to mate with ports 106F, 106G.

It should be appreciated that the association of apertures to ports can be determined based on a number of factors. In one exemplary embodiment, the relative size and location of ports 106 can be considered to determine the number of apertures 206 that are to be implemented in housing 204 to control access to such ports. For example, if certain ports 106 are located proximate to each other and if those ports are of the same or similar size, then two connectors 112 of approximately the same size and dimensions will be used to mate with such ports. Two distinct apertures 206 can be implemented, each dimensioned to receive a cable body 110 integral with a corresponding one of the two connectors. Alternatively, a single aperture 206 dimensioned for the concurrent passage of two such cable bodies 110 can be implemented. This alternative is illustrated in FIG. 2 in which ports 106A, 106B are similarly-dimensioned mouse and keyboard ports. As described above, aperture 206A is associated with ports 106A, 106B, and is dimensioned to receive two cable bodies 110A, 10B integral with connectors 112A, 112B. These cable bodies are of approximately the same diameter, and their associated connectors 112A, 112B are likewise of the same or similar dimensions. As such, aperture 206A can be dimensions as a channel, rectangle or other shape to permit passage of cable bodies 110A, 110B as shown, while preventing the passage of connectors 112A, 112B.

In addition, apertures 206 need not be located in any particular absolute or relative location. As shown in FIG. 2, each aperture 206 is at least partially aligned with its associated port(s) 106. Such alignment, although not necessary, enables the cable bodies 110 to traverse housing 202 easily and without having to bend within secure enclosure 204. Cables have a variety of features that affect their diameter and flexibility, including but not limited to, insulation, over-molding, and the like. Aligning aperture 206 with associated port(s) 106 may increase the operational life and integrity of certain types of cables.

It should also be appreciated that in alternative embodiments, features other than the dimension of apertures 206 can be utilized to restrict access to associated port(s). These include, but are not limited to, the orientation, dimensions, quantity and location of apertures 206. For example, to control access to USB ports 106D and 106E, aperture 206C can be slightly laterally offset from ports 106D, 106E. USB cables such as cable 110D are sufficiently flexible to bend to pass through such an offset aperture. On the other hand, disk on keys, which have an integral connector rigidly fixed directly to a memory device, could not be mated to with ports 106D, 106E through such an offset aperture. Thus, one of ordinary skill in the art should appreciate that the quantity, size, dimensions, location and orientation of apertures 206 is shown for exemplary purposes only, and any suitable combination of one or more of such aperture features may be utilized in embodiments of the present invention depending on the particular electronic device, the particular cable bodies that are to pass through the apertures, the particular cable connectors that are to be prevented from passing through the aperture and other factors.

As noted, the current port interface configuration of computer 106 includes four cables 108A–108D connected to four ports 106A–106D; the remaining three ports 106E–106G are available. To gain access to ports 106A–106G to change the current port interface configuration, port security apparatus 200 must be removed or opened depending on the implemented embodiment, and as described in detail below. Without access to secure enclosure 204, port access is restricted and the current port interface configuration is maintained. Advantageously, this prevents theft of data via, for example, USB port 106D, prevents control of any processors via, for example, ports 106A, B and D, and so on.

The means by which the present invention provides secure enclosure 204 varies with the type of configuration of the protected electronic device as well as the quantity, orientation and configuration of the ports 106 which are to be protected by the port security apparatus of the present invention, among other factors. Certain embodiments of port security apparatus 200 of the present invention are described below with reference to FIGS. 3 through 6.

Figure 3:
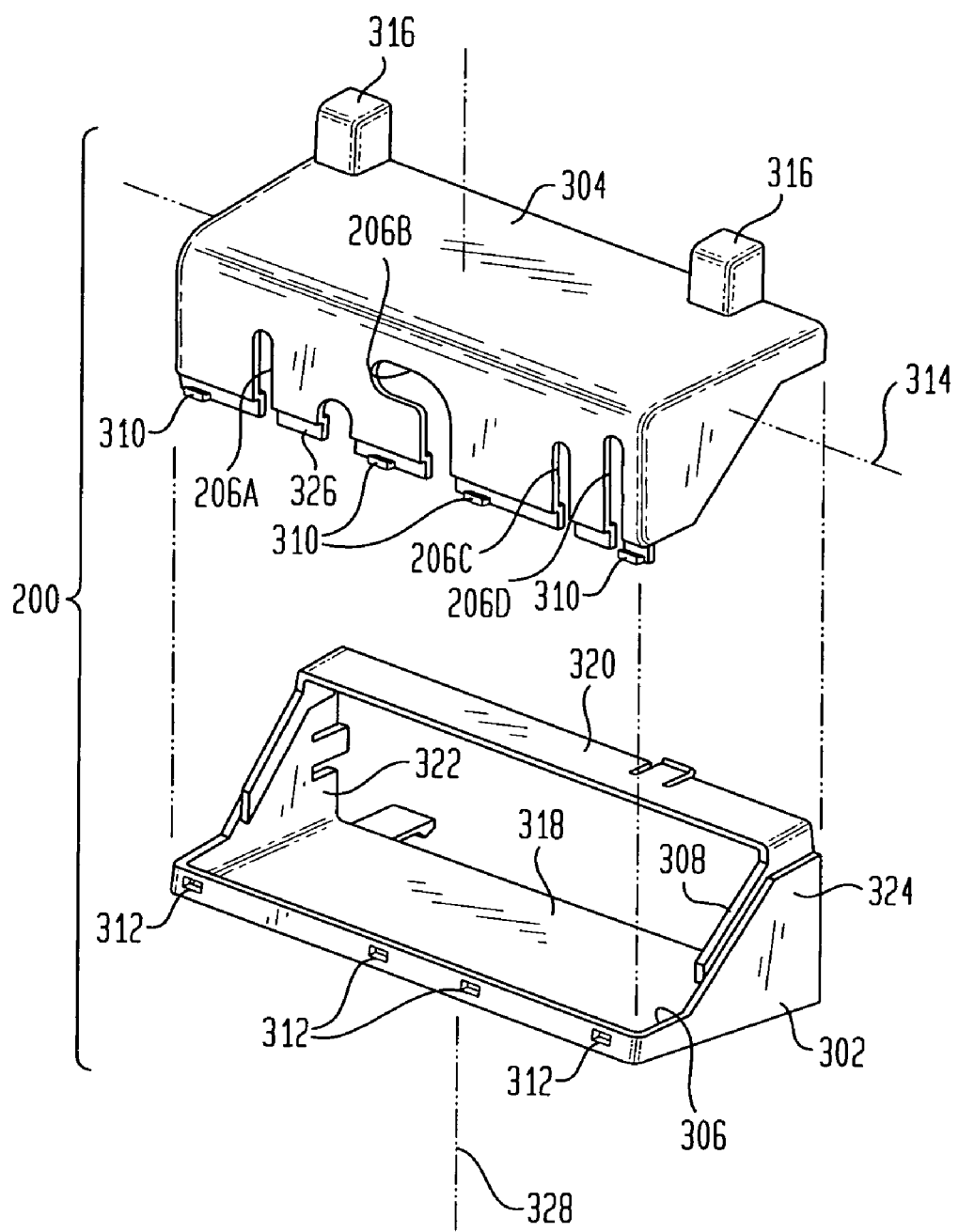
FIG. 3 is an exploded perspective view of one embodiment of the port security apparatus shown in FIG. 2.
Figure 4:
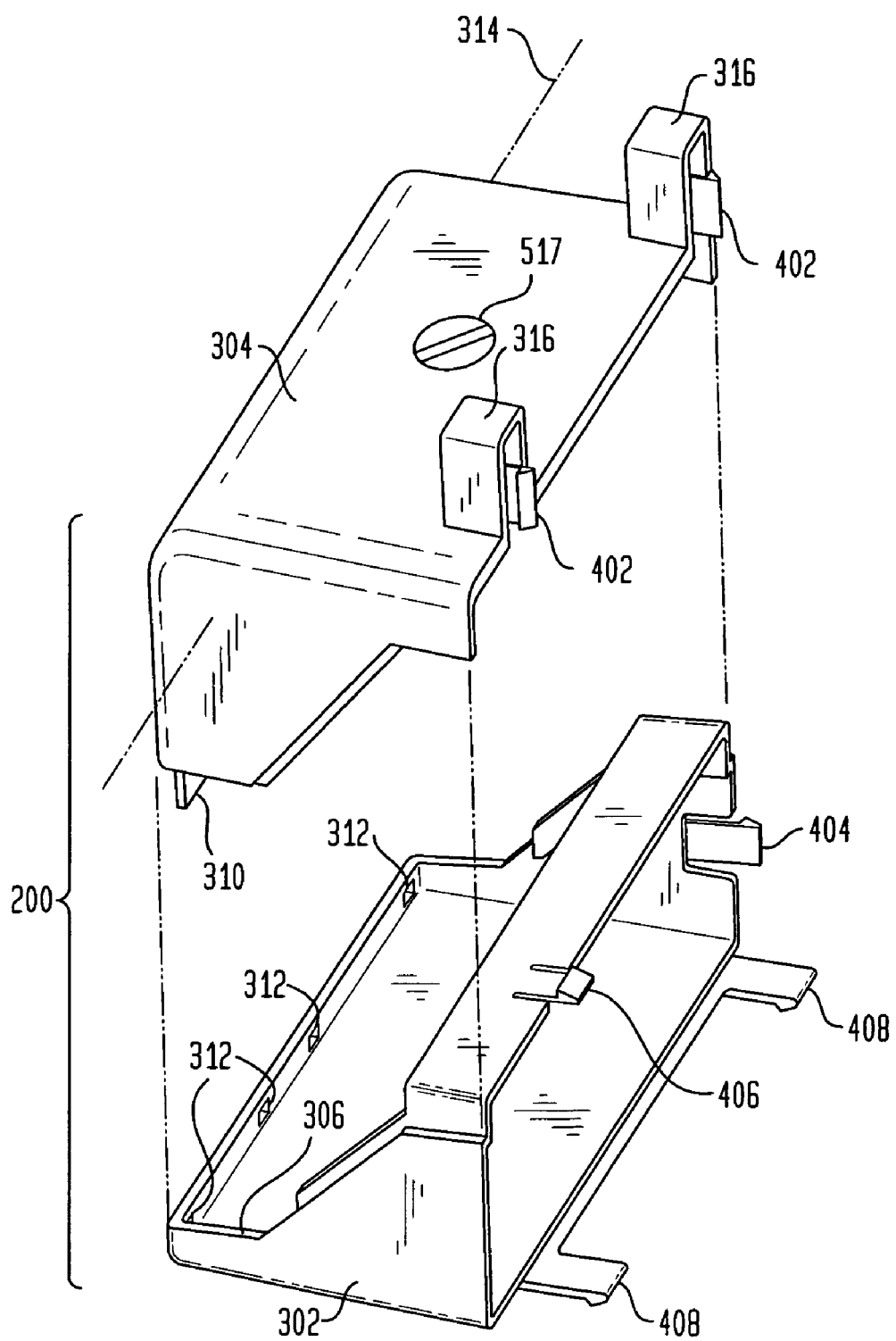
FIG. 4 is another exploded perspective view of one embodiment of the port security apparatus shown in FIG. 2.
Figure 5:
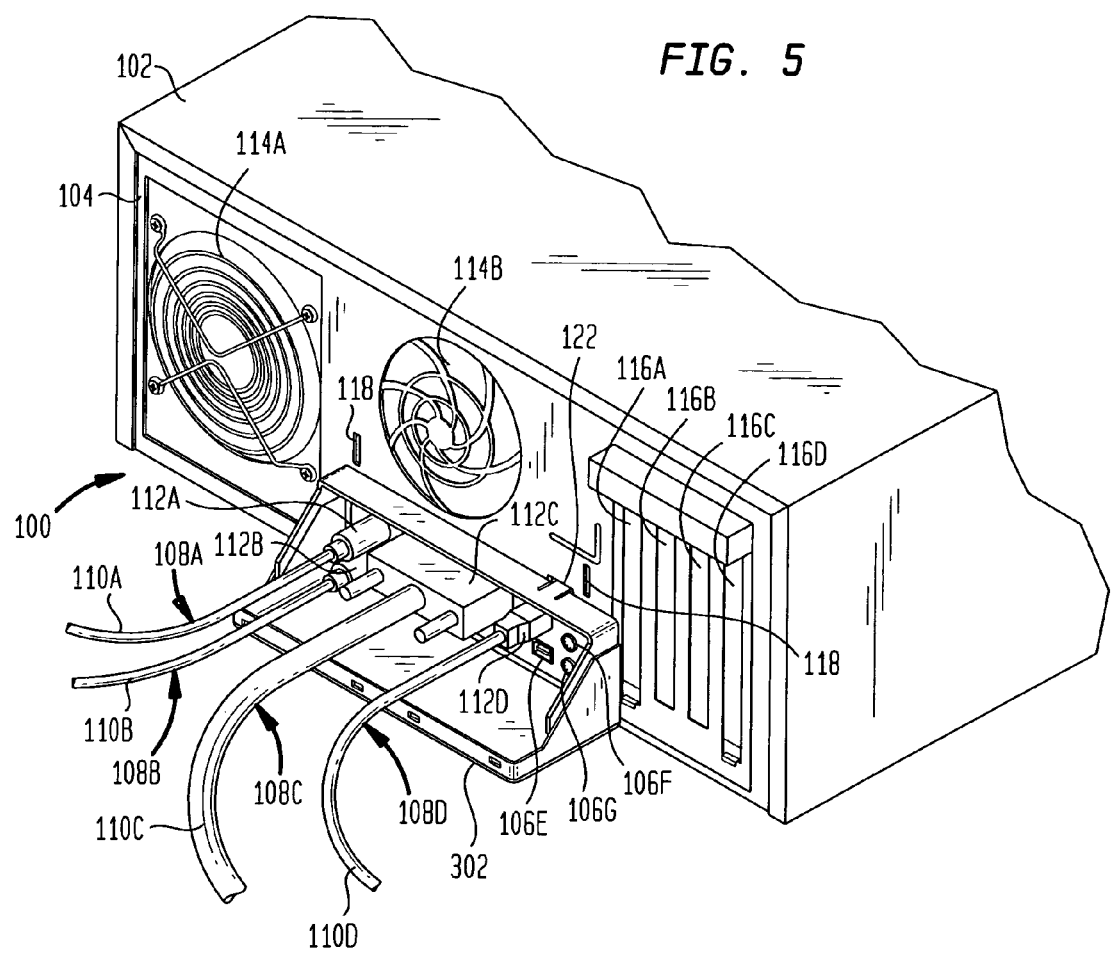
FIG. 5 is a perspective view of the desktop computer of FIGS. 1A and 1B with a housing base of the port security device of FIGS. 2 and 3 attached to the rear panel thereof, in accordance with one embodiment of the present invention.
Figure 6:
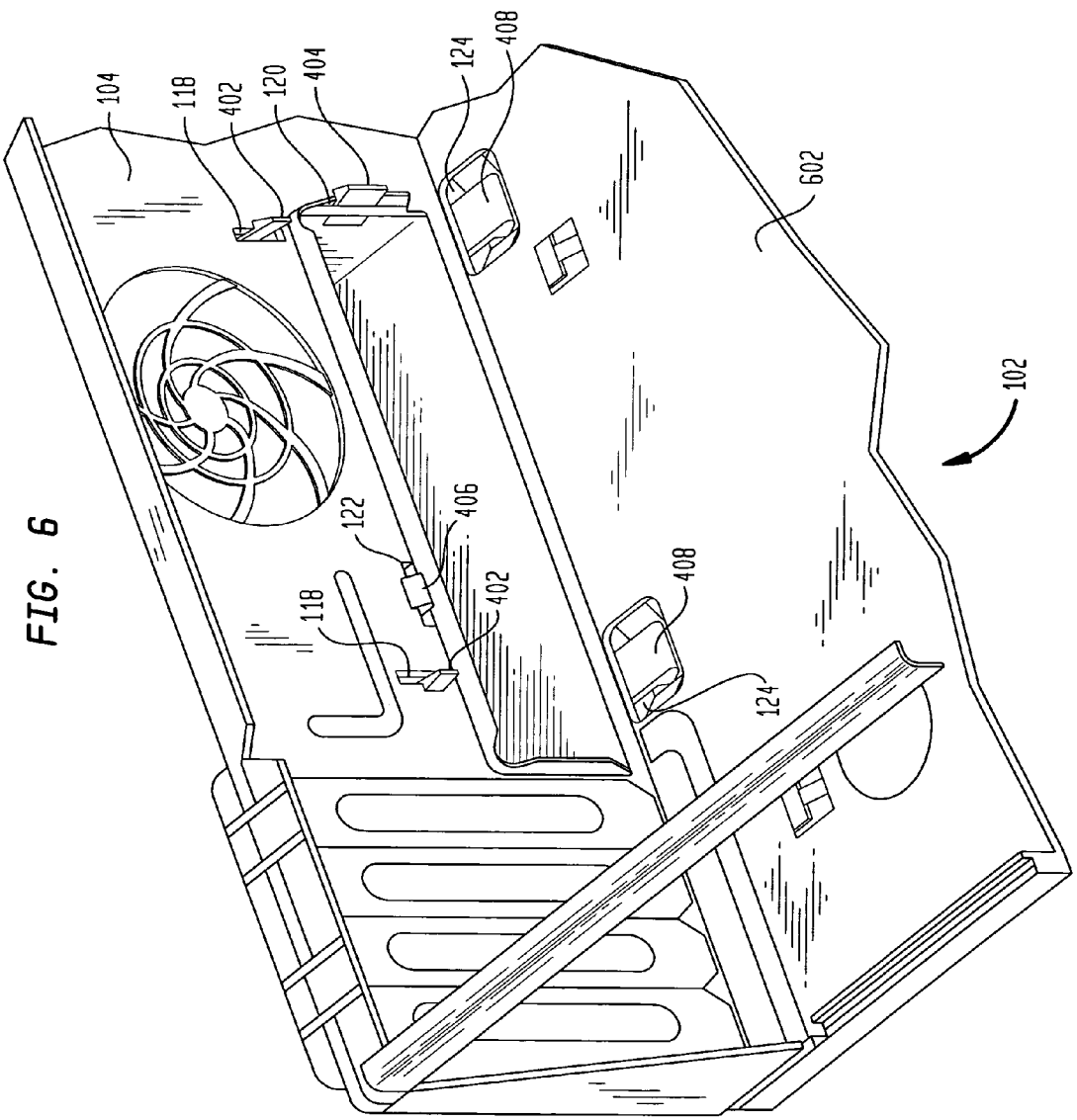
FIG. 6 is a perspective view of the interior surface of the rear panel shown in FIG. 2 with a port security cover attached to the exterior side of the rear panel, in accordance with one embodiment of the present invention.

FIGS. 3 and 4 are exploded perspective views of a two-piece port control apparatus 200 in accordance with one embodiment of the present invention. FIG. 5 is a perspective view of the desktop computer of FIGS. 1A and 1B with a housing base of the port security device of FIGS. 2 and 3 attached to the rear panel thereof, in accordance with one embodiment of the present invention. FIG. 6 is a perspective interior view of rear wall 104 of computer 100 when port control apparatus 200 is attached to computer 100.

Referring to FIGS. 3 and 4, housing 202 of this embodiment of port security apparatus 200 comprises a base 302 and a cover 304. Apertures 206A–206D are formed in cover 304 and have a perimeter defined by surfaces of both, cover 304 and base 302. The separation of housing base 302 and cover 304 opens apertures 206 enabling cable bodied 110 to be inserted into apertures 206. Housing base 302 has a bottom surface 318 that supports cable bodies 110, and a top surface 320 that supports cover 304. These top and bottom surfaces 318, 320, along with side walls 322, 324 provide an enclosed perimeter that surrounds ports 106 when base 302 is attached to computer 100. This embodiment of housing base 302 is secured to rear panel 104 as shown in FIGS. 5 and 6, described below. Cables 108 can be mated with ports 106A–106D subsequent to the attachment of base 302 to rear panel 104. Once connectors 112A–112D are mated with ports 106A–106D, housing cover 304 is lockingly attached to base 302 as described below to form secure enclosure 204.

Port security apparatus 200 further comprises one or more security mechanisms to insure enclosure 204 is secure from unauthorized access. In the embodiment shown in FIGS. 3 and 4, port access control base 302 and cover 304 are reversibly interlocked with each other. Housing base 302 has a ledge 306 to support housing cover 304. Sidewalls 322, 324 have a raised retaining wall 308 along an interior side of ledge 306 to prevent relative lateral movement of base 302 and cover 304. Interlocking tabs 310 extend from housing cover 304 to interlock with interlocking apertures 312 in housing base 302.

To interlock cover 304 and base 302, base 302 and cover 304 are brought together causing tabs 310 to engage locking apertures 312. As shown in FIG. 3, additional tabs 326 can also be provided on cover 304 to facilitate alignment of cover 304 and base 302. Cover 304 can be rotated about lateral axis 314 to facilitate such engagement. Once interlocking tabs and apertures 310, 312 are engaged, cover 304 is rotated as necessary and brought to rest on ledge 306. When attached to device 100, housing cover 304 and housing base 302 cannot be separated from each other. The device 100 and interlocking tab and aperture 310/312 prevent separation along vertical axis 328 and relative lateral movement in a direction orthogonical to vertical axis 318 and lateral axis 324. Secondly, retaining wall 308 and ledge 306 prevent relative lateral movement of base 302 and housing 304 along lateral axis 314.

It should be appreciated that the tab/aperture interlocking combination is an exemplary mechanism for interlocking a housing base 302 and a housing cover 304 according to one embodiment of the present invention. Other suitable interlocking mechanisms may be utilized including hooks, snaps, screws, and other tabs of various sizes and shapes, with complementary apertures or fittings. Furthermore, although FIGS. 3 and 4 are shown with tabs 310 on cover 304 and apertures 312 on base 302, the tabs and apertures, or other discussed embodiments, may be on either the base or the cover, as desired for particular applications.

As noted, port security apparatus 200 is secured to computer 100 to form secure enclosure 204. In the two-piece embodiment shown in FIGS. 3 and 4, either or both housing base 302 and housing cover 304 can be lockingly attached to device 100. The security mechanisms for interlocking port security apparatus 200 with an electronic device varies with the particular electronic device and may be modified by one of ordinary skill in the art according to the teachings of the present invention. In the particular embodiment shown in FIGS. 3–6, housing base 302 and housing cover 304 are each lockingly attached to computer 100. In this particular embodiment, detachment of port security apparatus 200 from computer 100 and/or the separation of housing base 302 and cover 304, requires a person to have access to the interior of chassis 102, which is restricted by conventional or other means.

Referring now to FIGS. 1, 4 and 6, port security apparatus 200 has tabs 402 for releasably engaging vertical channels 118 formed in rear panel 104 of computer 100. Similarly, housing base 302 has tabs 404 and 406 for releasably engaging interlocking channels 120, 122, respectively, formed in rear panel 104 laterally adjacent to and above ports 106. Housing base 302 also comprises tabs 408 for releasably engaging apertures 124 formed in a bottom panel 602 of computer 100.

Tabs 402, 404, 406 and 408 each include a locking protrusion on one surface of its free end. Tabs 402-408 are biased with sufficient tension to cause the respective lateral protrusion to catch rear or bottom panels 104, 602 when the tabs are inserted into their respective interlocking apertures 118, 120, 122 and 124. Removal of base 302 and cover 304 requires manually adjusting the tabs to disengage the locking protrusion from the rear or bottom wall 104, 602. As noted, such manual adjustment of tabs 402–408 requires authorized access to the interior of chassis 102.

It should be appreciated that to insure unauthorized access to ports 106 is maintained, all such tabs 402–408 should not be accessible from the exterior of computer 100. In the above embodiments, caps 316 are formed in housing cover 304 to cover tabs 402 to prevent access to tabs 402 from the exterior of computer 100 when port security cover 200 is attached to computer 100.

It should be appreciated that the tabs shown on port security apparatus 200 represent an exemplary mechanism for interlocking a port security apparatus with an electronic device according to embodiments of the present invention. Other suitable interlocking mechanisms may be utilized individually, or in combination, including hooks, snaps, screws, locks and other tabs of various sizes and shapes, with complementary apertures or fittings on the electronic device. Furthermore, any suitable number of tabs, or other interlocking mechanisms, may be used and such tabs may be in a variety of locations or orientations as required by the particular application.

As one or ordinary skill in the art would appreciate, the dimensions of the port security apparatus can be determined based on the size of connectors 112, the flexibility of cable bodies 110, the presence of mounting screws on connectors 112, etc. In addition, certain cable bodies 110 may include an electromagnetic interference (EMI) shield or other component along its length. One embodiment of the port security apparatus is dimensioned such that the portion of cable body 110 that extends between connector 112 and the noted EMI shield is that portion of cable body 110 that is passed through the associated aperture 206. As one of ordinary skill in the art would find apparent, additional or alternative factors can be considered in the determination of the dimensions of a port security apparatus.

The port security apparatus may be constructed from any suitable material, including plastic or metal. A particularly suitable material due to its strength and durability is a thermoplastic, such as LEXAN™ polycarbonate resin, as well as other similar plastics. It should be appreciated, however, that alternative or additional materials can be used in alternative embodiments of the present invention.

Security devices of the present invention may be constructed entirely separate from an associated electronic device or may be wholly or partially constructed in conjunction with at least one part of the electronic device. Thus, for example, a port security apparatus base may be constructed integrally with an access panel, hood, cover, chassis or casing of the electronic device, and the mateable element (i.e., the housing cover) may be a separate piece that may then be interlocked with the electronic device and the port security device base. The same scenario applies to a port security apparatus cover constructed integrally with an electronic device. Also, in alternative embodiments of the present invention, base and cover of a port security apparatus may be wholly integrally constructed with an electronic device. In such an embodiment, the housing base and housing cover should be interlockable with each other and should have an opening/closing apparatus to allow for the insertion or attachment of the cables, etc. to the associated ports prior to the device being locked.

In the above embodiments, port security apparatus 200 restricts access to ports 106 while preventing the removal of connectors 112A–112D from secure enclosure 204. In one alternative embodiment, the current port interface configuration is further maintained by the inclusion of features to prevent the unmating of connectors 112 currently mated with ports 106. For example, in the above embodiment, certain connectors, such as connector 112C, has mounting screws to insure connector 112C is fully mated with port 106C. When such screws are engaged, connector 112C cannot be unmated from port 106C without having access to secure enclosure 204 to unscrew the mounting screws. On the other hand, other connectors, such as connectors 112A and 112B, do not have screws or other features that must be manipulated to unmate the connectors and ports. Such connectors 112 can be unmated from their respective ports 106 by pulling on their respective integrated cable bodies 110. For such connectors, embodiments of the port security device can include spacers or other elements that consume the space between the rear of the connector and the interior wall of the housing 202 when the connector is mated to the port and the port security apparatus is attached to the device. Alternatively, housing 202 can include cantilevered retaining arms that are juxtaposed to certain ports 106. Such retaining arms are spaced away from their ports 106 such that when connectors 112 are mated with the ports, the connector is positioned between the port and the retaining arm, thereby preventing the connector from unmating in response to the application of tensile forces to the integrated cable body. As one of ordinary skill in the art would find apparent, other connector retaining features now or later developed can be implemented in alternative embodiments of the present invention.

Although the present invention has been fully described in conjunction with the certain embodiments thereof with reference to the accompanying drawings, it is to be understood that various changes and modifications may be apparent to those skilled in the art. For example, embodiments of the present invention have been described in connection with a desktop computer. As noted, the present invention can be implemented in any electronic device now or later developed. Such electronic devices include, but not limited to, computers, data storage devices, printers, plotters, workstations, cash registers, inventory control devices, audio/visual equipment, telecommunications and telephony equipment; photocopiers, networking devices including servers, routers, bridges and the like, etc. Thus, the present invention is not limited by application. As another example, port security covers can be configured to lockingly attach to more than one wall or surface of an electronic device depending on the location of the ports to be protected. For example, in one embodiment, the port security cover extends around to lockingly attack to surfaces of multiple panels of an electronic device. As another example, the port security cover according to embodiments of the present invention, such as those described above with reference to FIGS. 3–6, are comprised of a two-piece housing. It should be appreciated, however, that the port security cover may comprise a housing formed of greater than or less than two interlocking pieces. For example, in certain alternative embodiments, the port security cover has a multi-part or unibody construction. In a unibody embodiment, apertures 206 can be formed along one or more edges or corners of the housing such that the perimeter of the apertures is defined by the housing and surfaces of the electronics device to which the housing is attached. In alternative unibody embodiments, the housing can be constructed to permit the temporary expansion of the apertures to facilitate the passage of connectors 112 to mate with ports 106. Such expansion can be provided by hinged doors, retractable panels and the like. In such embodiments the unauthorized expansion of such apertures is prohibited by, for example, providing a latch or release mechanism accessible from the interior of the port control apparatus. As another example, in the embodiments described above with reference to FIGS. 3–6 in which the housing is formed of a base 302 and cover 304, the two housing elements can be completely separated from each other. In alternative embodiments, the housing cover may be unibody in construction with the housing base and cover connected via a hinged, creased or flexible joint, for example providing a clam-shell-type device. Regardless of the number of parts, a housing cover and base may be interlocked according to the mechanisms described herein. Further, the housing cover may also comprise a key activated lock 517, such as illustrated in FIG. 4. This key activated lock may be for securing the housing cover to at least one of the housing base and the electronic device. In a further alternative embodiment, the port security apparatus is comprises of a locking access panel through which the protected ports 106 can be accessed, and the cables 110 can be passed through apertures 206. Such changes and modifications are to be understood as included within the scope of the present invention as defined by the appended claims, unless they depart therefrom.

What is claimed is:

1. A port control apparatus for restricting access to ports of an electronic device, comprising:
   a housing constructed to lockingly attach to an exterior surface of the device to form an enclosure housing the ports, wherein formed in the housing is at least one aperture each associated with at least one port of the device, wherein each at least one aperture is dimensioned to prevent passage of a connector adapted to mate with the at least one associated port while permitting passage of cable bodies integral with any connector mated with an associated port; and
   a security mechanism configured to cause the housing to lockingly attach to the device, wherein the security mechanism is constructed to require access to the interior of the device to access the enclosure.

2. The apparatus of claim 1, wherein the housing comprises:
   a base interlockable with a panel of the device; and
   a cover interlockable with at least one of the base and device,
   wherein when interlocked together, the housing base, housing cover and device together form the enclosure, and wherein the security mechanism is further configured to prevent unauthorized penetration of the housing base, housing cover and device.

3. The apparatus of claim 2, wherein the at least one aperture is defined by surfaces of one or more of the base and cover.

4. The apparatus of claim 2, wherein the security mechanism comprises:
   a plurality of tabs extending from surfaces of at least on one of either the housing base, housing cover and device that abut surfaces of the other of the housing base, housing cover and device; and
   a plurality of interlocking apertures formed in the abutting surfaces of the housing base, housing cover and device, wherein each interlocking aperture is adapted to lockingly engage a corresponding one of the plurality of tabs.

5. The apparatus of claim 4, wherein the plurality of tabs can be disengaged from their corresponding interlocking apertures through at least authorized access to an interior of the electronics device.

6. The apparatus of, claim 5, wherein the housing cover further comprises a key-activated lock for securing the housing cover to at least one of the housing base and the electronic device.

7. The apparatus of claim 1, wherein the electronic device comprises a computer.

8. The apparatus of claim 1, wherein the electronic device comprises a data storage device.

9. The apparatus of claim 1, wherein the security mechanism comprises a unibody construction.

10. The apparatus of claim 1, wherein at least one of the base and cover are constructed integrally with the electronic device.

11. The apparatus of claim 1, wherein said security mechanism is formed of at least one material of the group consisting of a plastic, a thermoplastic and a metal.

12. An apparatus for restricting access to at least one port of an electronic device, comprising:
   a housing constructed to be lockingly engaged to an exterior surface of the electronic device to form a secure enclosure housing the at least one port, wherein formed in the housing is at least one aperture each associated one or more of the at least one port, each aperture being dimensioned to prevent removal of a connector adapted to mate with any of its associated one or more ports while permitting passage of any cable bodies integral with any connector mated to its associated one or more ports; and
   a security mechanism configured to lockingly attach the housing to the electronic device, wherein the security mechanism is constructed to require access to the interior of the device to access the ports housed in the enclosure.

13. The apparatus of claim 12, wherein each of the plurality of apertures is at least partially aligned with its associated one or more ports when the apparatus is attached to the electronic device.

14. The apparatus of claim 12, wherein the housing comprises:
   a plurality of interlockable walls lockingly attached to each other and to the device; and
   wherein when interlocked together, the housing base, housing cover and device together form the secure enclosure.

15. The apparatus of claim 14, wherein the at least one aperture is defined by surfaces of at least one of the plurality of interlockable walls.

16. The apparatus of claim 14, wherein the security mechanism comprises:
   a plurality of tabs extending from surfaces of at least one of the plurality of interlocking walls and device that abut surfaces of the other of the interlocking walls and device; and
   a plurality of interlocking apertures formed in the abutting surfaces of the interlocking walls and device, wherein each interlocking aperture is adapted to lockingly engage a corresponding one of the plurality of tabs.

17. The apparatus of claim 16, wherein at least one of the plurality of tabs can be disengaged from their corresponding interlocking apertures from the interior of the electronics device.

18. The apparatus of claim 17, wherein the housing further comprises a key-activated lock for securing the port security apparatus to the electronic device.

19. The apparatus of claim 12, wherein the electronic device comprises a computer.

20. The apparatus of claim 12, wherein the electronic device comprises a data storage device.

21. The apparatus of claim 12, wherein the port security apparatus comprises a unibody construction.

22. The apparatus of claim 12, wherein said security mechanism is formed of at least one material of the group consisting of a plastic, a thermoplastic and a metal.

23. An electronic device, comprising:
- a chassis comprising a plurality of walls and a plurality of ports accessibly located on at least one of the plurality of walls to which cables can be connected to operationally couple the electronic device with one or more external devices; and
- a secure enclosure that houses at least one of the plurality of ports, wherein unauthorized access to the operational capabilities of, and data stored in, the electronic device, via the ports, is prevented, wherein the secure enclosure comprises a housing with at least one aperture associated with at least one of the plurality of ports, wherein each of the at least one aperture is dimensioned to prevent a connector adapted to mate with its associated at least one port from passing through the housing while permitting passage of cable bodies integral with connectors mated with the at least one associated port; and
- a security mechanism configured to lockingly attach the housing to the electronic device, wherein the security mechanism is constructed to require access to the interior of the device to access an interior of the enclosure.

24. The electronic device of claim 23, wherein the housing comprises:
- at least two interlocking components with at least one aperture formed in at least one of the interlocking components.

25. The electronic device of claim 23, wherein each of the at least one aperture is at least partially aligned with its associated one or more ports.

26. The apparatus of claim 23, wherein the electronic device comprises a computer.

27. A port control apparatus for restricting access to ports of an electronic device, comprising:
- housing means for lockingly attaching to an exterior surface of the device to form an enclosure housing the ports, wherein the housing means comprises at least one aperture means each associated with at least one port of the device, for preventing passage of a connector adapted to mate with the at least one associated port while permitting passage of cable bodies integral with any connector mated with an associated port; and
- security means for causing the housing to lockingly attach to the device, wherein the security means is constructed to require access to the interior of the device to access the enclosure.

\* \* \* \* \*

UNITED STATES PATENT AND TRADEMARK OFFICE
CERTIFICATE OF CORRECTION

PATENT NO.        : 6,970,351 B2
APPLICATION NO. : 10/808359
DATED              : November 29, 2005
INVENTOR(S)       : Juan M. Perez et al.

It is certified that error appears in the above-identified patent and that said Letters Patent is hereby corrected as shown below:

In column 4, line 47, delete "10B" and insert -- 110B --, therefor.

In column 10, line 8, in Claim 6, delete "of," and insert -- of --, therefor.

Signed and Sealed this

Eleventh Day of August, 2009

David J. Kappos
*Director of the United States Patent and Trademark Office*